United States Patent
Hayashi

(10) Patent No.: US 11,958,028 B2
(45) Date of Patent: Apr. 16, 2024

(54) PREPARATION APPARATUS

(71) Applicant: DENSO TEN Limited, Kobe (JP)

(72) Inventor: Hisaki Hayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 203 days.

(21) Appl. No.: 17/405,096

(22) Filed: Aug. 18, 2021

(65) Prior Publication Data

US 2022/0193622 A1 Jun. 23, 2022

(30) Foreign Application Priority Data

Dec. 21, 2020 (JP) ................................. 2020-211718

(51) Int. Cl.
*B01F 35/22* (2022.01)
*B01F 23/40* (2022.01)
(Continued)

(52) U.S. Cl.
CPC ........ *B01F 35/2209* (2022.01); *B01F 23/405* (2022.01); *B01F 33/403* (2022.01);
(Continued)

(58) Field of Classification Search
CPC ........................ B01F 23/405; B01F 35/2114; B01F 35/2136; B05D 1/005
See application file for complete search history.

(56) References Cited

U.S. PATENT DOCUMENTS 4,112,026 A * 9/1978 Kumazawa ........... C02F 3/1294
239/420
4,714,931 A * 12/1987 Erskine .................. G01N 11/06
347/7
(Continued)

FOREIGN PATENT DOCUMENTS

JP     S50-033875 A     4/1975
JP     S59-114418 A     7/1984
(Continued)

OTHER PUBLICATIONS

English translation of JP-H11162817-A, obtained from <https://worldwide.espacenet.com/> on Apr. 28, 2023 (Year: 2023).*
(Continued)

*Primary Examiner* — Marc C Howell
*Assistant Examiner* — Patrick M McCarty
(74) *Attorney, Agent, or Firm* — Oliff PLC

(57) ABSTRACT

A preparation apparatus includes a first tank, a second tank, a preparation tank, and a computer having a hardware processor. The first tank contains a first liquid. The second tank contains a second liquid having a lower viscosity than the first liquid. The preparation tank stirs the first liquid supplied from the first tank and the second liquid supplied from the second tank to prepare a preparation liquid. The hardware processor measures a viscosity of the first liquid based on a supply time required to supply a specified amount of the first liquid at a constant pressure from the first tank to the preparation tank, and supplies an amount of the second liquid to the preparation tank based on the measured viscosity of the first liquid so as to cause the preparation liquid to have a target viscosity.

10 Claims, 10 Drawing Sheets

(51) Int. Cl.
    *B01F 33/40*     (2022.01)
    *B01F 35/10*     (2022.01)
    *B01F 35/21*     (2022.01)
    *B01F 35/221*     (2022.01)
    *B01F 35/71*     (2022.01)
    *B01F 23/47*     (2022.01)

(52) U.S. Cl.
    CPC ...... *B01F 35/1452* (2022.01); *B01F 35/2112* (2022.01); *B01F 35/2115* (2022.01); *B01F 35/2136* (2022.01); *B01F 35/22162* (2022.01); *B01F 35/2217* (2022.01); *B01F 35/71805* (2022.01); *B01F 23/471* (2022.01)

(56) References Cited

U.S. PATENT DOCUMENTS

| | | | | |
|---|---|---|---|---|
| 4,967,782 | A * | 11/1990 | Yamashita | G03F 7/162 |
| | | | | 137/92 |
| 5,330,576 | A * | 7/1994 | Clauditz | B41F 23/08 |
| | | | | 118/688 |
| 5,880,356 | A * | 3/1999 | Delepierre-Massue | ...... |
| | | | | G01F 22/02 |
| | | | | 73/149 |
| 6,025,012 | A * | 2/2000 | Matsuda | B05C 11/08 |
| | | | | 118/712 |
| 6,428,852 | B1 * | 8/2002 | Pillion | G03F 7/162 |
| | | | | 438/782 |
| 6,503,568 | B1 * | 1/2003 | Oota | G03F 7/162 |
| | | | | 118/712 |
| 6,740,163 | B1 * | 5/2004 | Curtiss | G03F 7/16 |
| | | | | 118/423 |
| 7,531,040 | B2 * | 5/2009 | Consolini | H01L 21/6715 |
| | | | | 118/52 |
| 10,741,427 | B2 * | 8/2020 | Wang | B08B 9/0328 |
| 2003/0033799 | A1 * | 2/2003 | Scheying | B01D 53/9431 |
| | | | | 60/286 |
| 2003/0192920 | A1 * | 10/2003 | Forshey | C30B 25/14 |
| | | | | 222/504 |
| 2004/0110394 | A1 * | 6/2004 | Barth | H01L 21/02205 |
| | | | | 438/782 |
| 2012/0299989 | A1 * | 11/2012 | Prothon | B41J 2/17596 |
| | | | | 347/6 |
| 2021/0033976 | A1 * | 2/2021 | He | B01F 35/187 |

FOREIGN PATENT DOCUMENTS

| | | |
|---|---|---|
| JP | S61-092299 U | 6/1986 |
| JP | S61-170815 A | 8/1986 |
| JP | H03-192408 A | 8/1991 |
| JP | H08-242842 A | 9/1996 |
| JP | H10-242045 A | 9/1998 |
| JP | H11-162817 A | 6/1999 |
| JP | 2003-63032 A | 3/2003 |
| JP | 2005-336289 A | 12/2005 |
| JP | 2007-103895 A | 4/2007 |
| JP | 2009-125729 A | 6/2009 |

OTHER PUBLICATIONS

English translation of JP-2005336289A, Tanaka et al. obtained from <https://worldwide.espacenet.com/> on Apr. 29, 2023 (Year: 2023).*
Nov. 30, 2021 Office Action issued in Japanese Patent Application No. 2020-211718.

* cited by examiner

PREPARATION APPARATUS

BACKGROUND OF THE INVENTION

Field of the Invention

The invention relates to a preparation apparatus and a preparation method.

Description of the Background Art

Conventionally, for example, a preparation apparatus that prepares a moisture-proof material, etc., to be applied to a printed board at a target viscosity has been known. The preparation apparatus prepares a preparation liquid by mixing a diluted solution having a lower viscosity than an undiluted solution with the undiluted solution while measuring a viscosity of the mixture using a viscosity sensor so that a viscosity of the preparation liquid reaches a target viscosity (for example, refer to Japanese Published Unexamined Patent Application No. 2007-103895).

Here, the viscosity sensor has a characteristic that a measurement accuracy becomes lower (resolution becomes wider) as a measurement range is wider. Thus, in a preparation method in which the diluted solution is gradually added to the undiluted solution, a sensor having a wide measurement range and a low accuracy is used in an initial stage of preparation and a sensor having a narrow measurement range and a high accuracy is used in a final stage of the preparation to reach a target viscosity. As described above, conventionally, since different viscosity sensors having different measurement ranges have been required to enable a wide range of viscosity measurement, there has been a problem that a manufacturing cost becomes high.

SUMMARY OF THE INVENTION

According to one aspect of the invention, a preparation apparatus includes a first tank, a second tank, a preparation tank, and a computer having a hardware processor. The first tank contains a first liquid. The second tank contains a second liquid having a lower viscosity than the first liquid. The preparation tank stirs the first liquid supplied from the first tank and the second liquid supplied from the second tank to prepare a preparation liquid. The hardware processor measures a viscosity of the first liquid based on a supply time required to supply a specified amount of the first liquid at a constant pressure from the first tank to the preparation tank, and supplies an amount of the second liquid to the preparation tank based on the measured viscosity of the first liquid so as to cause the preparation liquid to have a target viscosity.

It is an object of the invention to provide a preparation apparatus and a preparation method capable of suppressing a manufacturing cost of the apparatus.

These and other objects, features, aspects and advantages of the invention will become more apparent from the following detailed description of the invention when taken in conjunction with the accompanying drawings.

DESCRIPTION OF THE EMBODIMENTS

A preparation apparatus and a preparation method disclosed in this application will be described in detail below with reference to the drawings. This invention is not limited to an embodiment described below.

Figure 1:
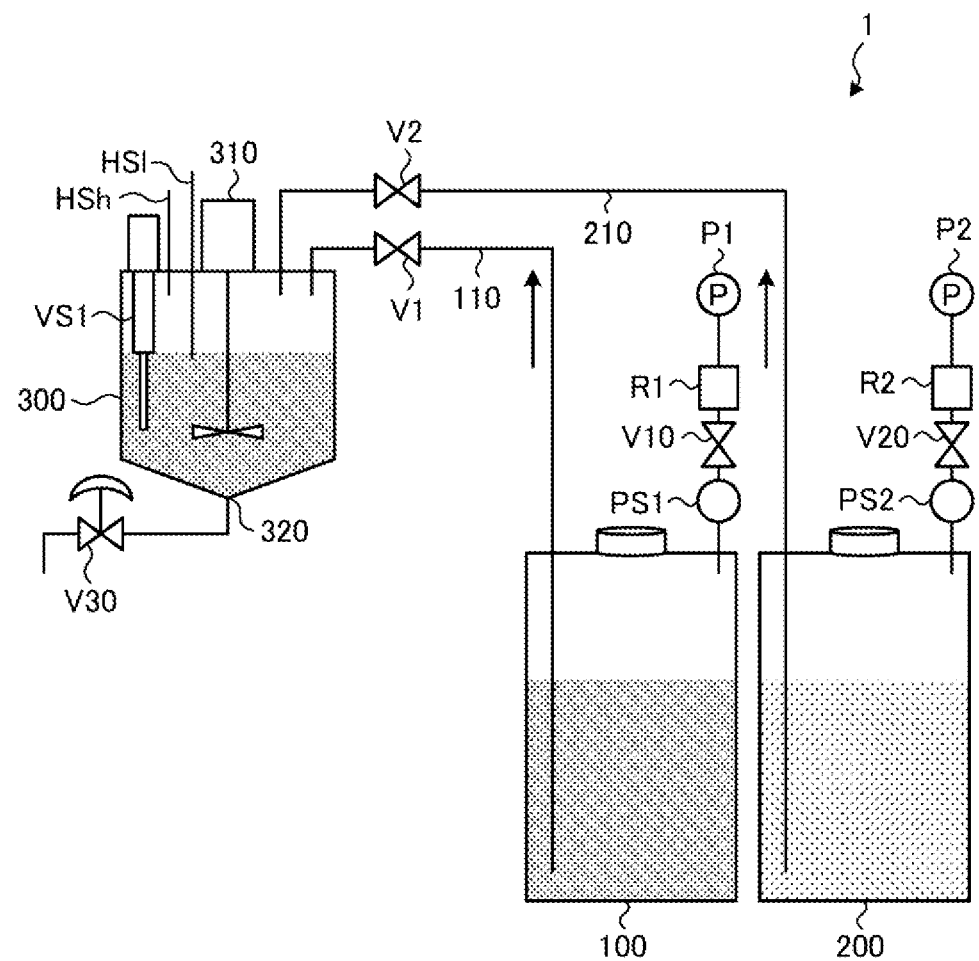
FIG. 1 illustrates a configuration example of a preparation apparatus according to an embodiment.

Moreover, an example in which a moisture-proof material to be applied to a printed board is prepared as preparation liquid will be described below. However, the preparation liquid may be, for example, other liquid, such as paint, and the like. In other words, the preparation liquid may be prepared by mixing two types of liquid having different viscosities First, FIG. 1 illustrates a configuration example of the preparation apparatus according to the embodiment. As illustrated in FIG. 1, a preparation apparatus 1 according to the embodiment includes an undiluted solution tank (one example of a first tank) 100, a diluted solution tank (one example of a second tank) 200, a preparation tank 300, and a control apparatus 10 (refer to FIG. 2). The undiluted solution tank 100 and the preparation tank 300 are connected to each other through an undiluted solution supply route 110 that is provided with a first electromagnetic valve V1. The diluted solution tank 200 and the preparation tank 300 are connected to each other through a diluted solution supply route 210 that is provided with a second electromagnetic valve V2.

The undiluted solution tank 100 contains an undiluted solution of the moisture-proof material (one example of a first solution). As illustrated in FIG. 1, a pump P1, a pressure regulator R1, a pressure valve V10, and a pressure sensor PS1 are connected to the undiluted solution tank 100.

The pump P1 generates compressed air for pressurizing an interior of the undiluted solution tank 100. The pressure regulator R1 maintains the compressed air generated by the pump P1 at a constant pressure and supplies the compressed air to the undiluted solution tank 100. The pressure valve V10 is, for example, an electromagnetic valve. The pressure sensor PS1 detects a pressure of the pressurized interior of the undiluted solution tank 100. In such a configuration, the interior of the undiluted solution tank 100 is pressurized at the constant pressure.

When the first electromagnetic valve V1 is opened by control of the control apparatus 10, the undiluted solution tank 100 supplies the undiluted solution stored in the undiluted solution tank 100 to the preparation tank 300 via the undiluted solution supply route 110. Since the interior of the undiluted solution tank 100 is pressurized at the constant pressure, the undiluted solution is supplied to the preparation tank 300 at the constant pressure.

The diluted solution tank 200 contains a diluted solution (one example of a second solution) that dilutes the undiluted solution. The diluted solution has a lower viscosity than the undiluted solution and is, for example, a thinner solution. As illustrated in FIG. 1, a pump P2, a pressure regulator R2, a pressure valve V20, and a pressure sensor PS2 are connected to the diluted solution tank 200.

The pump P2 generates compressed air for pressurizing an interior of the diluted solution tank 200. The pressure regulator R2 maintains the compressed air generated by the pump P2 at a constant pressure and supplies the compressed air to the diluted solution tank 200. The pressure valve V20 is, for example, an electromagnetic valve. The pressure sensor PS2 detects a pressure of the pressurized interior of the diluted solution tank 200. In such a configuration, the interior of the diluted solution tank 200 is pressurized at the constant pressure.

When the second electromagnetic valve V2 is opened by the control of the control apparatus 10, the diluted solution tank 200 supplies the diluted solution stored in the diluted solution tank 200 to the preparation tank 300 via the diluted solution supply route 210. Since the interior of the diluted solution tank 200 is pressurized at the constant pressure, the diluted solution is supplied to the preparation tank 300 at the constant pressure.

The preparation tank 300 stirs the undiluted solution supplied from the undiluted solution tank 100 and the diluted solution supplied from the diluted solution tank 200 to prepare the moisture-proof material as the preparation liquid. The preparation tank 300 has a stirring apparatus 310, a liquid level sensor HSh, a liquid level sensor HSl, and a viscosity sensor VS1.

The stirring apparatus 310 stirs the preparation liquid in the preparation tank 300 using a stirring blade. Each of the liquid level sensors HSh and HSl detects a liquid level of the preparation liquid stored in the preparation tank 300. Specifically, the liquid level sensor HSl detects whether or not the preparation liquid reaches a first liquid level, and the liquid level sensor HSh detects whether or not the preparation liquid reaches a second liquid level higher than the first liquid level.

The first liquid level to be detected by the liquid level sensor HSl is a liquid level up to which the viscosity sensor VS1 can measure a viscosity of the preparation liquid and is a minimum value of the liquid level up to which the preparation tank 300 can stir. The second liquid level is a maximum value of the liquid level up to which the preparation tank 300 can stir. That is, the preparation liquid is prepared in a range between the first liquid level and the second liquid level.

The viscosity sensor VS1 measures the viscosity of the preparation liquid. The viscosity sensor VS1 has a measurement range before and after a target viscosity. The viscosity sensor VS1 has a relatively narrow measurement range and places value on accuracy.

Figure 6:
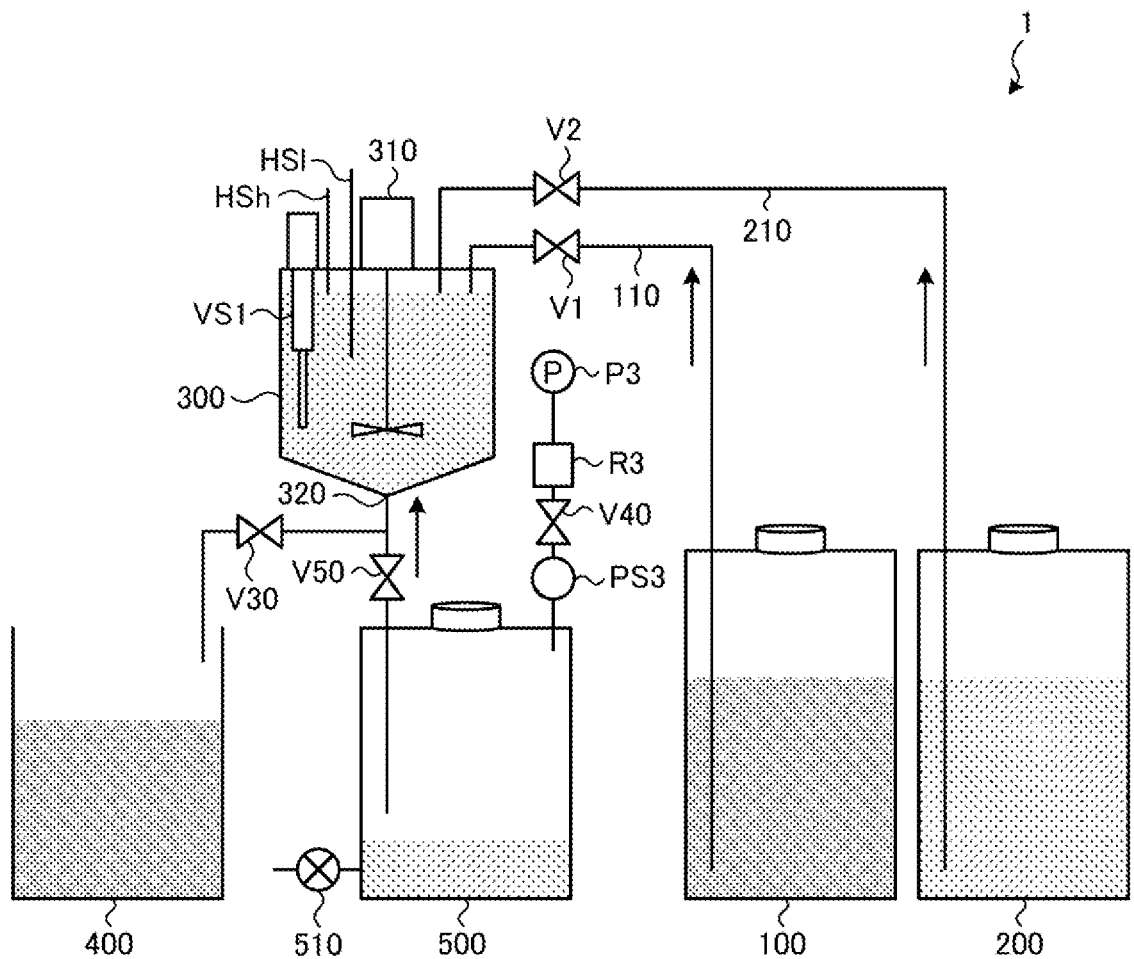
FIG. 6 is an explanatory drawing of a washing process of a preparation tank.

After preparation, when a manual valve V30 is opened by a worker, the preparation liquid in the preparation tank 300 is discharged from a discharge port 320 to a prepared preparation liquid tank 400 (refer to FIG. 6). That is, the preparation apparatus 1 according to the embodiment is a batch preparation apparatus using a capacity of the preparation tank 300 as one batch.

Here, the preparation method according to the embodiment will be described. As described above, the quality of the moisture-proof material of the printed board depends on the viscosity of the moisture-proof material to be applied. Specifically, when the viscosity is high, since the moisture-proof material does not spread on the printed board, coating is not sufficient. When the viscosity is low, the moisture-proof material spreads to a region of the printed that should not be coated.

Thus, conventionally, a sensor having a wide measurement range and a low accuracy has been used in an initial stage of preparation (rough preparation) and a sensor having a narrow measurement range and a high accuracy has been used in a final stage of preparation (precise preparation) to reach the target viscosity. As described above, conventionally, since different viscosity sensors having different measurement ranges have been required to enable a wide range of viscosity measurement, there has been a problem that a manufacturing cost of the apparatus increases.

Therefore, in the preparation method according to the embodiment, since a viscosity of the undiluted solution is measured from a supply time of the undiluted solution, the viscosity sensor (having a wide measurement range and a low accuracy) that is used in the rough preparation is omitted.

Specifically, in the preparation method according to the embodiment, first, the supply time required to supply a specified amount of the undiluted solution at a constant pressure from the undiluted solution tank 100 to the preparation tank 300 is measured. Subsequently, in the preparation method, the viscosity of the undiluted solution is measured based on the measured supply time. Then, in the preparation method, since the diluted solution is supplied to the preparation tank 300 based on the measured viscosity, the preparation liquid is prepared at the target viscosity.

That is, in the preparation method according to the embodiment, when the specified amount of the undiluted solution is supplied at the constant pressure, the supply time is proportional to the viscosity. Specifically, as the supply time is longer, the viscosity of the undiluted solution increases, and as the supply time is shorter, the viscosity of the undiluted solution decreases.

The viscosity measured from the supply time is used in the rough preparation. The viscosity sensor VS1 is used in the precise preparation to reach the target viscosity. As a result, an adjustment accuracy for the target viscosity is ensured.

As described above, in the preparation method according to the embodiment, since the viscosity is measured from the supply time of the undiluted solution, the viscosity sensor that is used in the rough preparation is unnecessary. Therefore, according to the preparation method according to the embodiment, it is possible to suppress the manufacturing cost of the apparatus.

Figure 2:
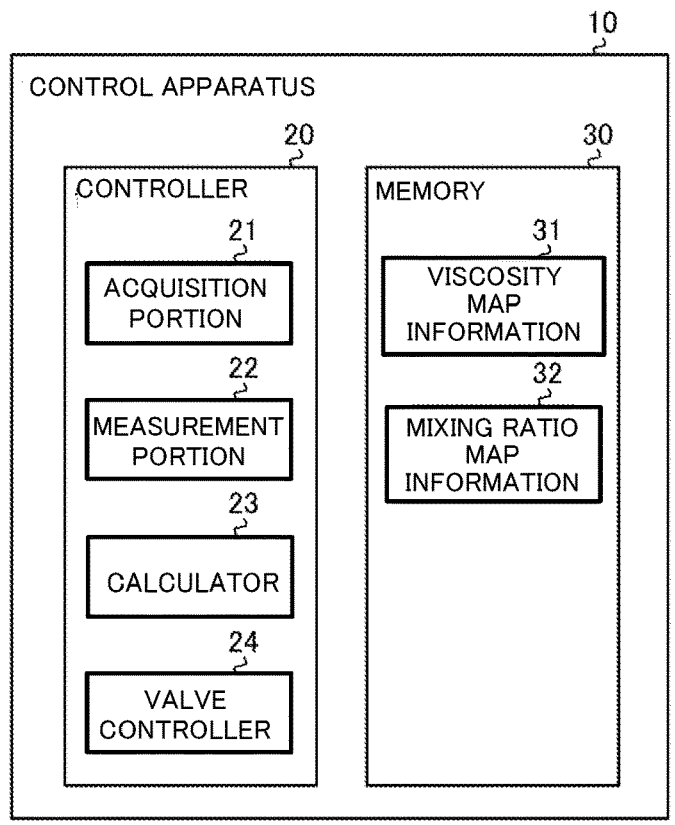
FIG. 2 is a block diagram illustrating a configuration example of a control apparatus according to the embodiment.

Next, a configuration of the control apparatus 10 of the preparation apparatus 1 according to the embodiment will be described with reference to FIG. 2. FIG. 2 is a block diagram illustrating a configuration example of the control apparatus 10 according to the embodiment. As illustrated in FIG. 2, the control apparatus 10 includes a controller 20 and a memory 30.

Here, the control apparatus 10 includes a computer having, for example, a CPU (Central Processing Unit), a ROM (Read Only Memory), a RAM (Random Access Memory), a flash memory, an input/output port, and the like, and various circuits.

The CPU of the computer reads out and executes a program stored in the ROM, for example, so as to function as an acquisition portion 21, a measurement portion 22, a calculator 23 and a valve controller 24 of the controller 20.

At least one or all of the acquisition portion 21, the measurement portion 22, the calculator 23 and the valve controller 24 of the controller 20 may be constituted of hardware such as an ASIC (Application Specific Integrated Circuit) and an FPGA (Field Programmable Gate Array).

The memory 30 corresponds to the RAM and/or flash memory. The RAM and the flash memory are able to store viscosity map information 31, mixing ratio map information 32, and various program information, and the like. The control apparatus 10 may acquire the above-mentioned program and various information via another computer connected to the control apparatus 10 by using a wired/wireless network, or a portable recording medium.

Figure 3:
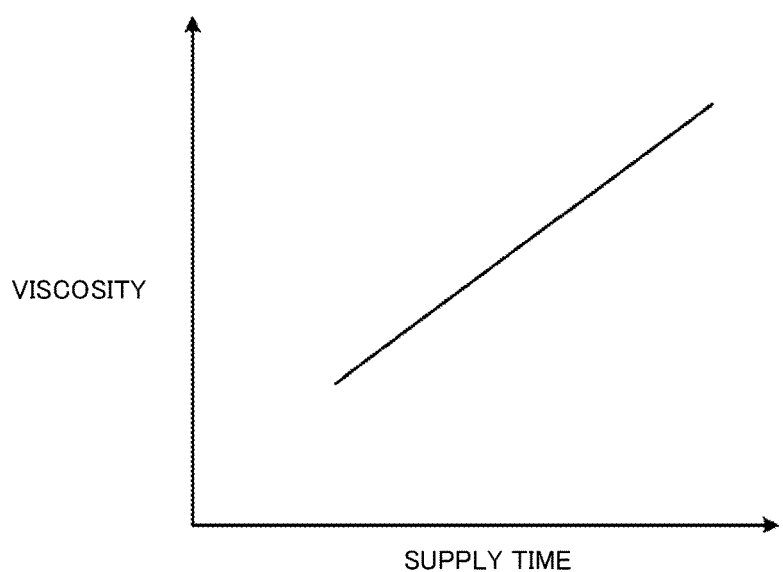
FIG. 3 is one example of viscosity map information.

The viscosity map information 31 is information for measuring the viscosity by the measurement portion 22 described later. FIG. 3 is one example of the viscosity map information 31. The viscosity map information 31 illustrated in FIG. 3 is generated from experimental results, etc. beforehand. As illustrated in FIG. 3, the viscosity map information 31 is map information that associates the supply time with the viscosity. The supply time is a time period during which the specified amount of the undiluted solution is supplied to the preparation tank 300. The viscosity is the viscosity of the undiluted solution.

As illustrated in FIG. 3, in the viscosity map information 31, as the supply time is longer, the viscosity of the undiluted solution increases. That is, the supply time is proportional to the viscosity.

Figure 4:
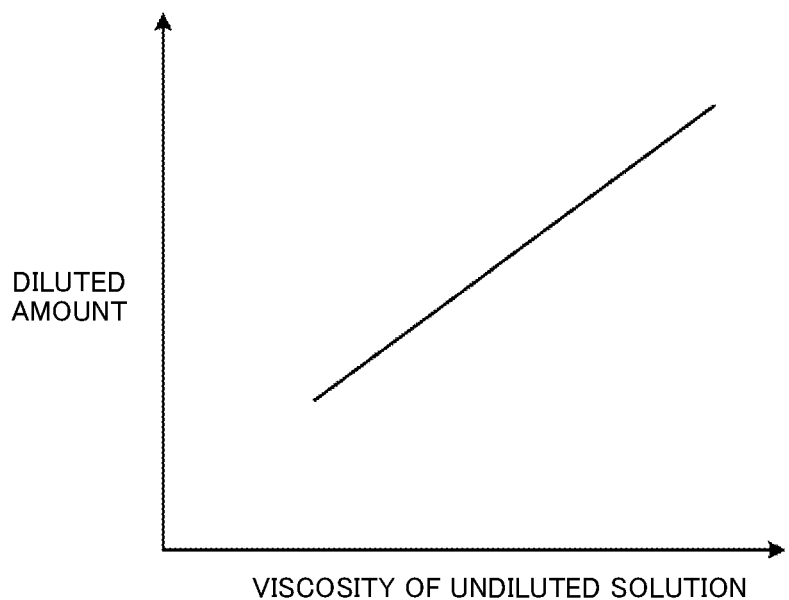
FIG. 4 is one example of mixing ratio map information.

The mixing ratio map information 32 is information for calculating an amount of the diluted solution (i.e., a diluted amount) necessary for causing the preparation liquid to have the target viscosity. FIG. 4 is one example of the mixing ratio map information 32. The mixing ratio map information 32 illustrated in FIG. 4 is generated from experimental results, etc. beforehand. As illustrated in FIG. 4, the mixing ratio map information 32 is map information that associates the viscosity of the undiluted solution with the diluted amount.

As illustrated in FIG. 4, in the mixing ratio map information 32, as the viscosity of the undiluted solution increases, the diluted amount increases. That is, the viscosity of the undiluted solution is proportional to the diluted amount.

Next, each function of the controller 20 (the acquisition portion 21, the measurement portion 22, the calculator 23 and the valve controller 24) will be described.

The acquisition portion 21 acquires various information. For example, the acquisition portion 21 acquires information of a sensor value of the pressure sensor PS1 provided in the undiluted solution tank 100 and information of a sensor value of the pressure sensor PS2 provided in the diluted solution tank 200.

The acquisition portion 21 acquires information of sensor values of the viscosity sensor VS1, the liquid level sensors HSh and HSl provided in the preparation tank 300. The acquisition portion 21 acquires information of liquid temperatures of the undiluted solution, the diluted solution and the preparation liquid detected by a temperature sensor (not shown). The acquisition portion 21 acquires information of a sensor value of a pressure sensor PS3 provided in a washing tank 500 (refer to FIG. 6) described later.

The measurement portion 22 measures various information. For example, the measurement portion 22 measures the supply time required for supplying the specified amount of the undiluted solution from the undiluted solution tank 100 to the preparation tank 300. Specifically, the measurement portion 22, in an initial supply of the undiluted solution, measures a time from opening to closing of the first electromagnetic valve V1 provided in the undiluted solution supply route 110 as the supply time.

More specifically, the measurement portion 22 measures a time from starting of the supply of the undiluted solution to reaching the first liquid level detected by the liquid level sensor HSl in the preparation tank 300 as the supply time. That is, the specified amount means an amount of the undiluted solution that reaches the first liquid level in the preparation tank 300.

The measurement portion 22 refers to the viscosity map information 31 and measures the viscosity of the undiluted solution from the measured supply time. The measurement portion 22 may correct the measured viscosity according to the liquid temperature of the undiluted solution supplied to the preparation tank 300. As a result, even when the liquid temperature of the undiluted solution in the preparation tank 300 increases (or decreases) after the supply of the undiluted solution, the measurement portion 22 accurately measures the viscosity of the undiluted solution.

The measurement portion 22 measures a pressurizing time until the undiluted solution tank 100 is pressurized to a specified pressure by the pump P1. Specifically, the measurement portion 22 measures a time from opening of the pressure valve V10 to the sensor value of the pressure sensor PS1 reaching the specified pressure as the pressurizing time. Since a supply amount of the compressed air is kept constant by the pressure regulator R1, as a liquid level in the undiluted solution tank 100 decreases, the pressurizing time becomes longer.

The measurement portion 22 measures a pressurizing time until the diluted solution tank 200 is pressurized to a specified pressure by the pump P2. Specifically, the measurement portion 22 measures a time from opening of the pressure valve V20 to the sensor value of the pressure sensor PS2 reaching the specified pressure as the pressurizing time. Since a supply amount of the compressed air is kept constant by the pressure regulator R2, as a liquid level in the diluted solution tank 200 decreases, the pressurizing time becomes longer.

The calculator 23 calculates various information. For example, the calculator 23 calculates an initial supply amount of the diluted solution in the rough preparation based on the viscosity of the undiluted solution measured by the measurement portion 22. Specifically, the calculator 23 calculates the initial supply amount of the diluted solution from the measured viscosity of the undiluted solution with reference to the mixing ratio map information 32.

The initial supply amount is preferably slightly less than the diluted amount in the mixing ratio map information 32. As a result, at an end of the rough preparation, since the preparation liquid having a viscosity slightly higher than the target viscosity is prepared, it is possible to reduce a preparation time in the following precise preparation and to suppress a hunting phenomenon that the viscosity of the preparation liquid is lower or higher than the target viscosity.

The calculator 23 calculates a supply amount of the undiluted solution or the diluted solution in the precise preparation based on a current viscosity of the preparation liquid detected by the viscosity sensor VS1 provided in the preparation tank 300. For example, when the current viscosity is the same as the target viscosity, the calculator 23 calculates the supply amount of the undiluted solution or the diluted solution as zero. That is, preparation of the preparation liquid is completed.

Moreover, for example, when the current viscosity is higher than the target viscosity, the calculator 23 calculates the supply amount of the diluted solution based on a deviation between the current viscosity and the target viscosity. Specifically, the calculator 23 performs a PID calculation to perform a PID control for increasing the supply amount as the deviation increases and calculates the supply amount of the diluted solution based on the calculation result.

Moreover, for example, when the current viscosity is lower than the target viscosity, the calculator 23 calculates the supply amount of the undiluted solution based on the deviation between the current viscosity and the target viscosity. The calculator 23 performs the PID calculation to perform the PID control for increasing the supply amount as the deviation increases and calculates the supply amount of the undiluted solution based on the calculation result.

The calculator 23 may correct the supply amount of each of the undiluted solution and the diluted solution in the rough preparation and the precise preparation based on the liquid level in each of the undiluted solution tank 100 and the diluted solution tank 200. Specifically, the calculator 23 calculates the liquid level in the tank (the undiluted solution tank 100 or the diluted solution tank 200) based on the pressurizing time measured by the measurement portion 22. As a result, it is possible to accurately detect the liquid level with a simple configuration.

Then, the calculator 23 corrects a water head difference based on the calculated liquid level and corrects the calculated supply amount based on the corrected water head difference. As a result, it is possible to accurately calculate the supply amount.

The valve controller 24 controls the first electromagnetic valve V1 or the second electromagnetic valve V2 based on the supply amount calculated by the calculator 23. Specifically, the valve controller 24 supplies the undiluted solution or the diluted solution only by the supply amount by opening the first electromagnetic valve V1 or the second electromagnetic valve V2 for a time corresponding to the PID calculation result based on the deviation between the current viscosity and the target viscosity.

That is, the valve controller 24 controls the supply amount of each of the undiluted solution and the diluted solution to the preparation tank 300 by controlling open and close times of the first electromagnetic valve V1 or the second electromagnetic valve V2 based on the deviation between the current viscosity of the preparation liquid and the target viscosity. As described above, since the supply amount is controlled by the open and close times of the electromagnetic valves based on the PID calculation result, it is possible to accurately control the supply amount of each of the undiluted solution and diluted solution in the batch preparation apparatus 1.

Figure 5:
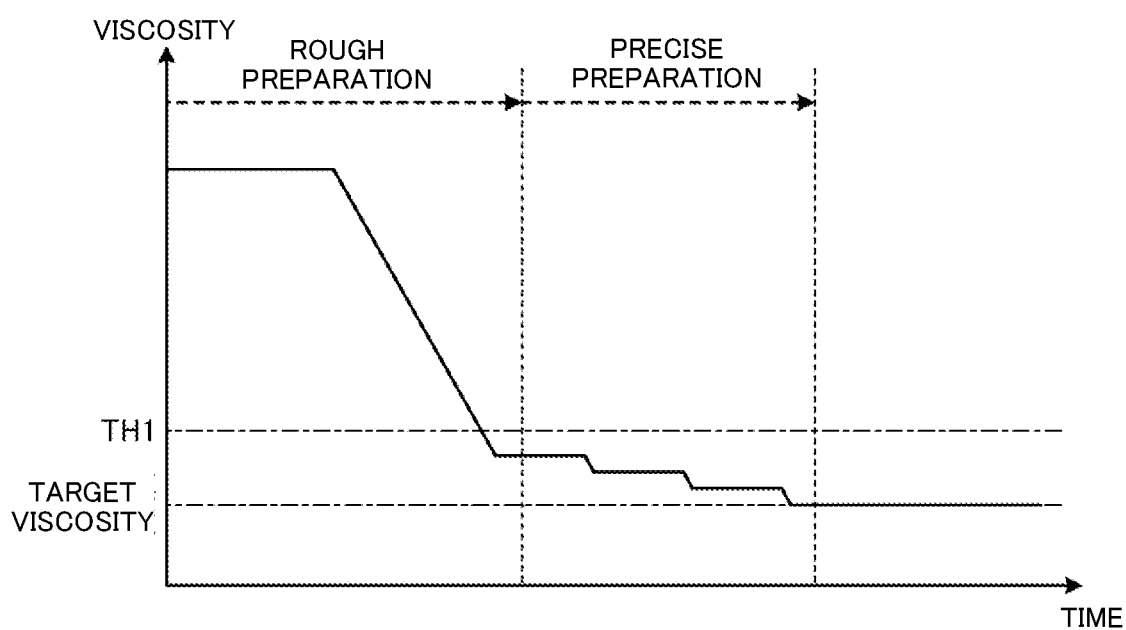
FIG. 5 is an explanatory drawing of a preparation method of preparation liquid.

Next, the preparation method of the preparation liquid will be more specifically described with reference to FIG. 5. FIG. 5 is an explanatory drawing of the preparation method of the preparation liquid. As illustrated in FIG. 5, the preparation method of the preparation liquid includes two steps of the rough preparation and the precise preparation.

A rough preparation step is a step for preparing the preparation liquid so that the preparation liquid has a viscosity close to the target viscosity. Specifically, the control apparatus 10 supplies the diluted solution based on the viscosity of the undiluted solution measured based on the supply time so as to set the viscosity of the preparation liquid higher than the target viscosity. More specifically, the control apparatus 10 supplies the diluted solution so as to set the viscosity of the preparation liquid to less than a threshold value TH1.

A precise preparation step is a step for preparing the preparation liquid so that the preparation liquid having a viscosity less than the threshold value TH1 has the target viscosity. Specifically, since the control apparatus 10 supplies the diluted solution to the preparation tank 300 based on the viscosity of the preparation liquid after the supply of the diluted solution measured by the viscosity sensor VS1, the preparation liquid is prepared at the target viscosity.

More specifically, since the control apparatus 10 supplies a small amount of the diluted solution a plurality of times, the control apparatus 10 gradually brings the viscosity of the preparation liquid closer to the target viscosity. As described above, since the preparation liquid is prepared in the rough preparation and the precise preparation, the preparation liquid is accurately prepared at the target viscosity.

The control apparatus 10 controls the supply amount of each of the diluted solution and the undiluted solution in the precise preparation based on the supply time. That is, the control apparatus 10 controls the supply amount of the liquid based on the supply time in a state in which a pressure of the liquid supplied from the undiluted solution tank 100 and the diluted solution tank 200 to the preparation tank 300 is kept constant. As a result, since a sensor, and the like, for detecting the supply amount becomes unnecessary, it is possible to suppress the manufacturing cost of the apparatus.

Figure 7:
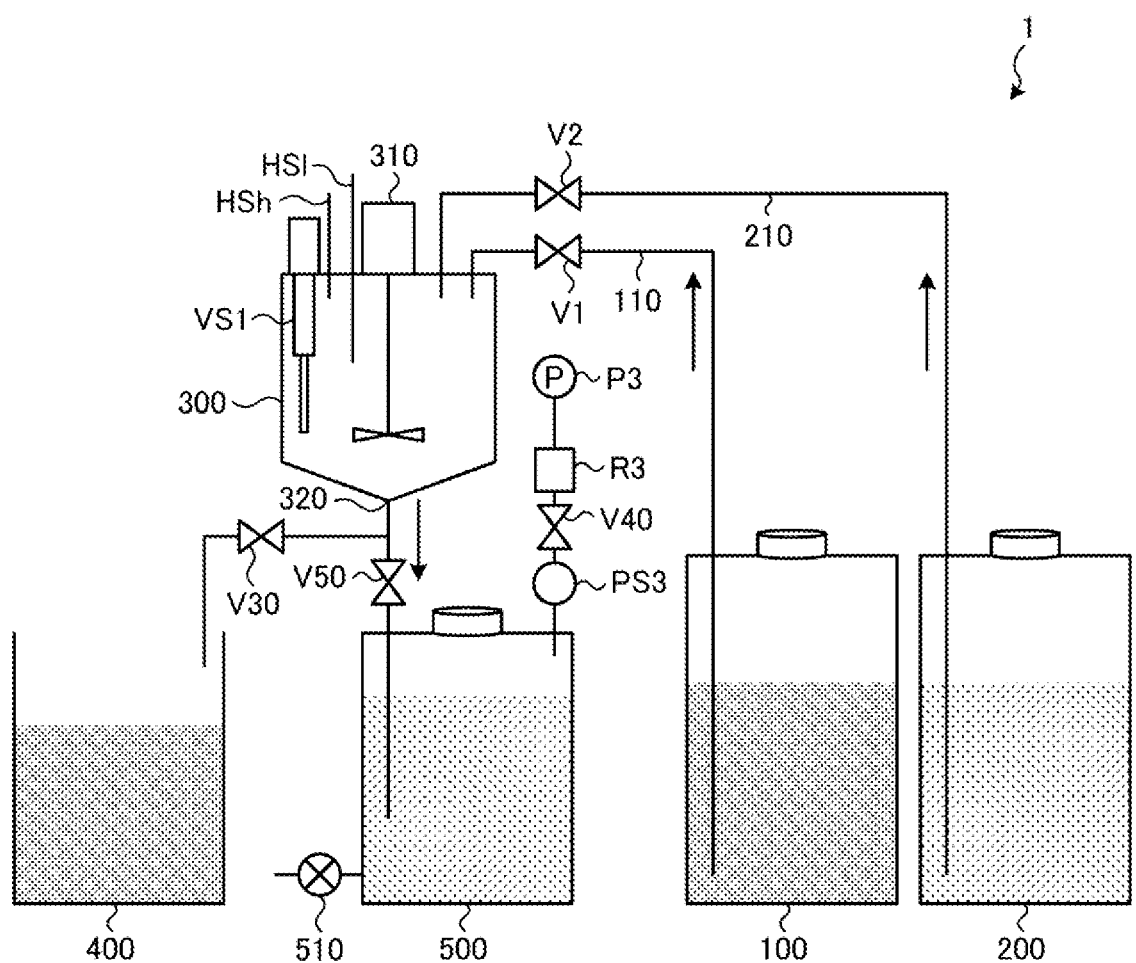
FIG. 7 is an explanatory drawing of the washing process of the preparation tank.

Next, a washing process of the preparation tank 300 will be described with reference to FIG. 6 and FIG. 7. Each of FIG. 6 and FIG. 7 is an explanatory drawing of the washing process of the preparation tank 300. As illustrated in FIG. 6 and FIG. 7, the preparation apparatus 1 further includes the prepared preparation liquid tank 400 and the washing tank 500.

The prepared preparation liquid tank 400 is a tank for storing the prepared preparation liquid after being prepared in the preparation tank 300. The preparation liquid stored in the prepared preparation liquid tank 400 is sent to an application apparatus that applies the moisture-proof material to the printed board.

The washing tank 500 is a tank for storing washing liquid for washing the preparation tank 300. The washing liquid is the diluted solution. A pump P3, a pressure regulator R3, a pressure valve V40, and a pressure sensor PS3 are connected to the washing tank 500.

The pump P3 generates compressed air for pressurizing an interior of the washing tank 500. The pressure regulator R3 maintains the compressed air generated by the pump P3 at a constant pressure and supplies the compressed air to the washing tank 500. The pressure valve V40 is, for example, an electromagnetic valve. The pressure sensor PS3 detects a pressure of the pressurized interior of the washing tank 500. In such a configuration, the interior of the washing tank 500 is pressurized at a constant pressure.

When the electromagnetic valve V50 is opened by the control of the control apparatus 10, the washing tank 500 supplies the diluted solution stored in the washing tank 500 to the preparation tank 300 via the discharge port 320. FIG. 6 shows an example in which the diluted solution as the washing liquid reaches the second liquid level (a sensor value of the liquid level sensor HSh) in the preparation tank 300.

After the preparation tank 300 is filled with the washing liquid, the control apparatus 10 drives the stirring apparatus 310 to stir the washing liquid in the preparation tank 300 to wash the preparation tank 300. After stirring for a certain time, the control apparatus 10 stops the stirring apparatus 310, opens the electromagnetic valve V50, and moves the washing liquid from the preparation tank 300 to the washing tank 500. At this time, the pump P3 is stopped and the washing liquid is moved to the washing tank 500 by gravity.

After a predetermined number of times of the washing process, in other words, when a content of the preparation liquid in the washing liquid is a predetermined amount or more, the washing liquid is discharged from a discharge valve 510 and is replaced with the new diluted solution.

As described above, in the washing process after discharging the preparation liquid, the control apparatus 10 supplies the diluted solution as the washing liquid from the washing tank 500 to the preparation tank 300 via the discharge port 320, and after washing, discharges the washing liquid from the preparation tank 300 to the washing tank 500 via the discharge port 320.

As a result, since it is possible to wash out residues in the preparation tank 300 or near the discharge port 320, the washing effect is improved. Moreover, since the diluted solution is used as the washing liquid, an effect of the washing liquid in a next process (next batch) is eliminated.

Figure 8:
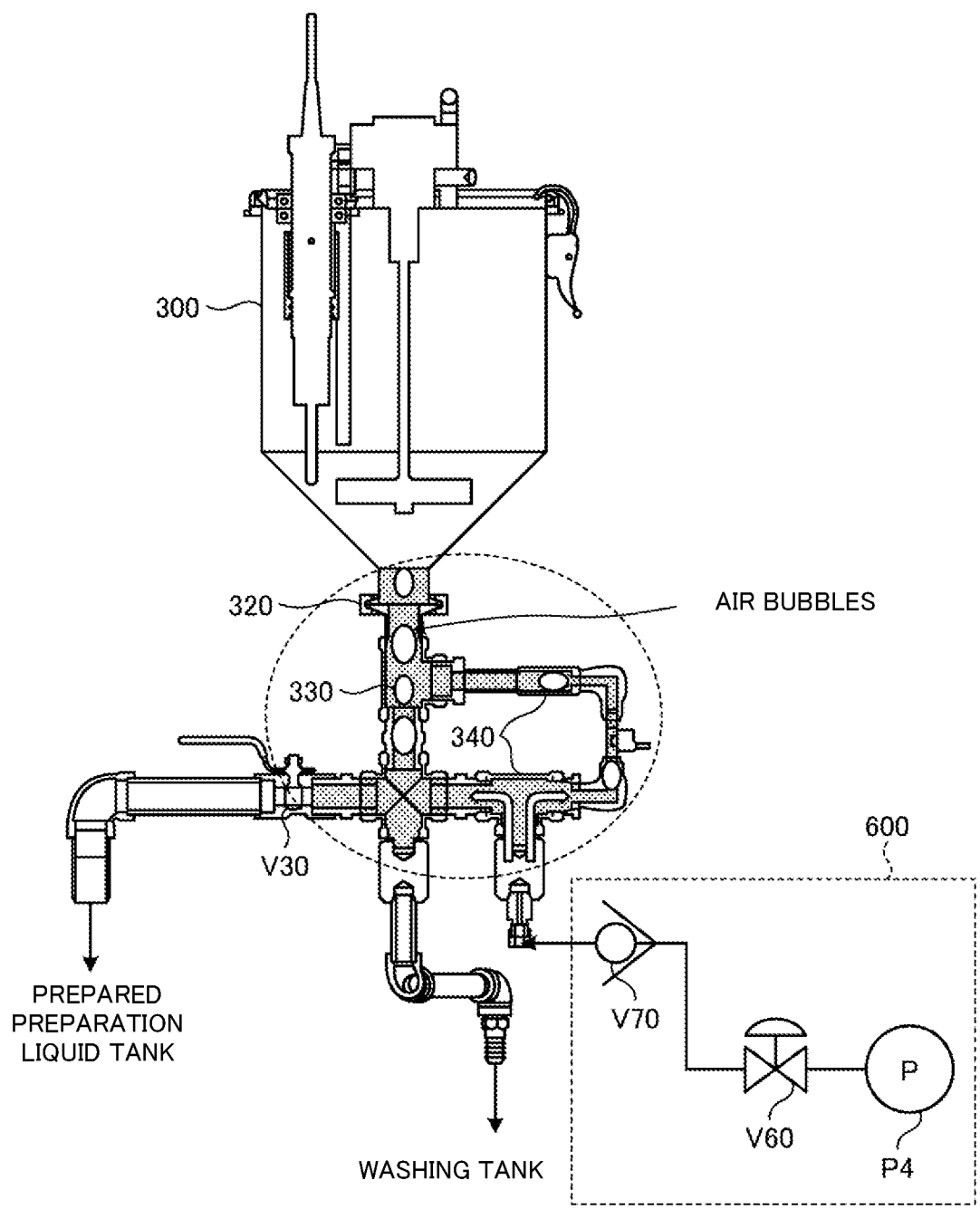
FIG. 8 is an explanatory drawing of a method of stirring in a pipe positioned downstream of a discharge port.

Next, a method of stirring the preparation liquid in a pipe positioned downstream of the discharge port 320 with reference to FIG. 8. FIG. 8 is an explanatory drawing of the method of stirring in the pipe positioned downstream of the discharge port; 320. As illustrated in FIG. 8, a discharge route 330 for discharging the preparation liquid to the prepared preparation liquid tank 400 (one example of an external device) and a branched route 340 branched from the discharge route 330 are connected to the discharge port 320 in the downstream of the discharge port 320 of the preparation tank 300.

In this embodiment, a bubble supply apparatus 600 that supplies air bubbles from the branched route 340 to the discharge port 320 is connected to the branched route 340. The bubble supply apparatus 600 includes a pump P4, a manual valve V60, and a backflow prevention valve V70. The backflow prevention valve V70 prevents the preparation liquid from flowing back from the branched route 340 to a side of the pump P4.

The bubble supply apparatus 600 intermittently generates compressed air from the pump P4 and supplies the compressed air to the branched route 340 according to the control of the control apparatus 10 so as to generate the air bubbles. Then, the generated air bubbles are sent to the discharge port 320 in an upstream of the branched route 340 and discharged at a top of the preparation tank 300.

That is, the control apparatus 10 stirs the preparation liquid filled between the branched route 340 and the discharge port 320 by the bubble supply apparatus 600 supplying the air bubbles. As a result, since the preparation liquid in the pipe is accurately stirred, it is possible to reduce a piping loss. A strength of the air bubbles (air amount) and a completion time may be adjusted according to materials used.

Next, a processing procedure executed by the preparation apparatus 1 according to the embodiment will be described with reference to FIG. 9 to FIG. 12. Each of FIG. 9 to FIG. 12 is a flowchart illustrating the processing procedure executed by the preparation apparatus 1 according to the embodiment.

First, the processing procedure in the rough preparation will be described with reference to FIG. 9.

Figure 9:
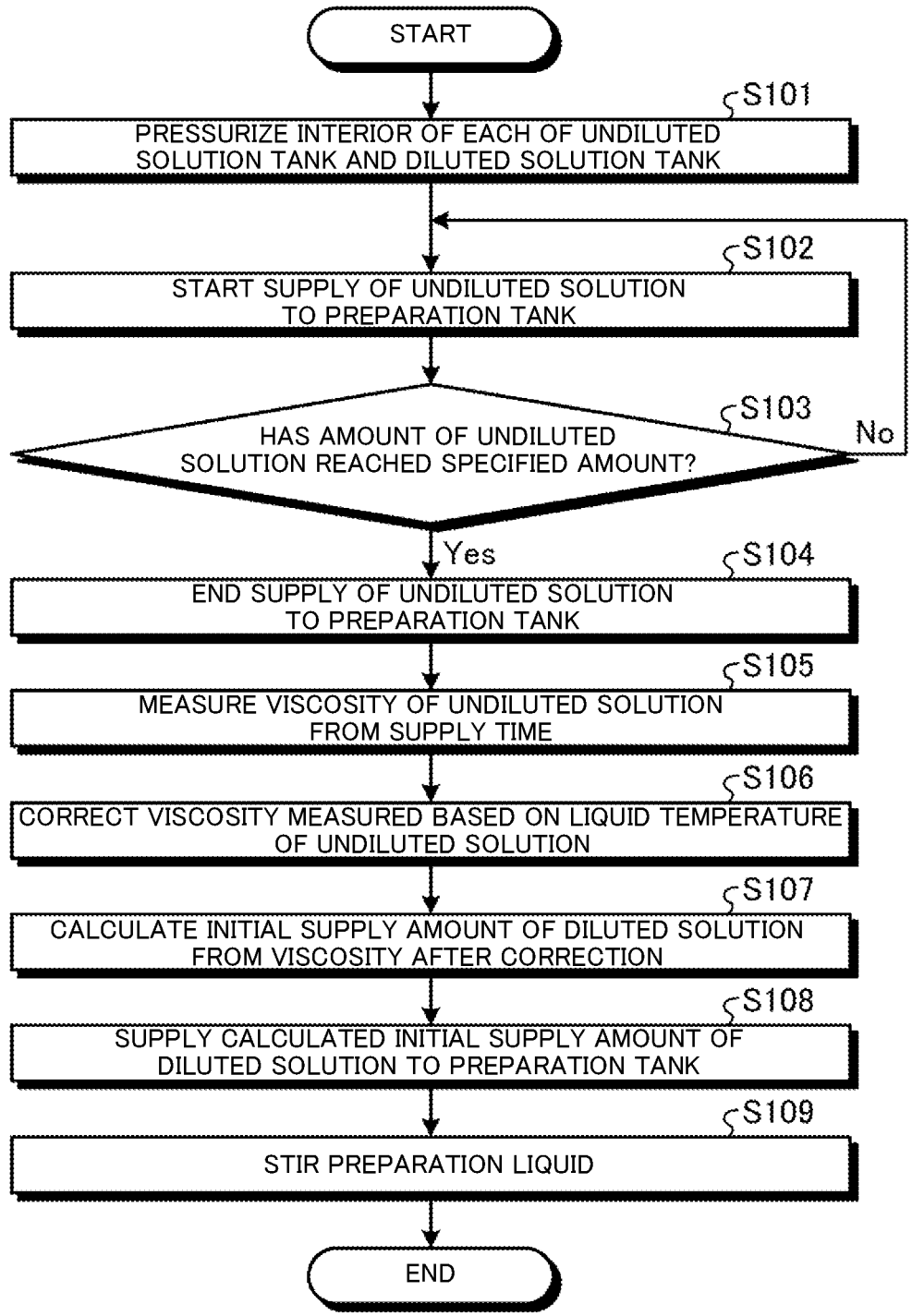
FIG. 9 is a flowchart illustrating a processing procedure executed by the preparation apparatus according to the embodiment.

As illustrated in FIG. 9, the preparation apparatus 1, first, pressurizes the interior of each of the undiluted solution tank 100 and the diluted solution tank 200 (a step S101). Subsequently, the preparation apparatus 1 starts the supply of the undiluted solution from the undiluted solution tank 100 to the preparation tank 300 (a step S102).

Subsequently, the preparation apparatus 1 determines whether or not the amount of the undiluted solution stored in the preparation tank 300 has reached the specified amount (a step S103). When the amount of the undiluted solution has reached the specified amount (Yes in the step S103), the preparation apparatus 1 ends the supply of the undiluted solution to the preparation tank 300 (a step S104). When the amount of the undiluted solution has not reached the specified amount (No in the step S103), the preparation apparatus 1 returns to the step S102.

Subsequently, the preparation apparatus 1 measures the viscosity of the undiluted solution from the supply time of the specified amount of the undiluted solution (a step S105). Subsequently, the preparation apparatus 1 corrects the viscosity measured based on the liquid temperature of the undiluted solution stored in the preparation tank 300 (a step S106).

Subsequently, the preparation apparatus 1 calculates the initial supply amount of the diluted solution from the viscosity after the correction (a step S107). Subsequently, the preparation apparatus 1 supplies the calculated initial supply amount of the diluted solution to the preparation tank 300 (a step S108). Subsequently, the preparation apparatus 1 stirs the preparation liquid using the stirring apparatus 310 (a step S109) and ends the process.

Next, the processing procedure in the precise preparation will be described with reference to FIG. 10.

Figure 10:
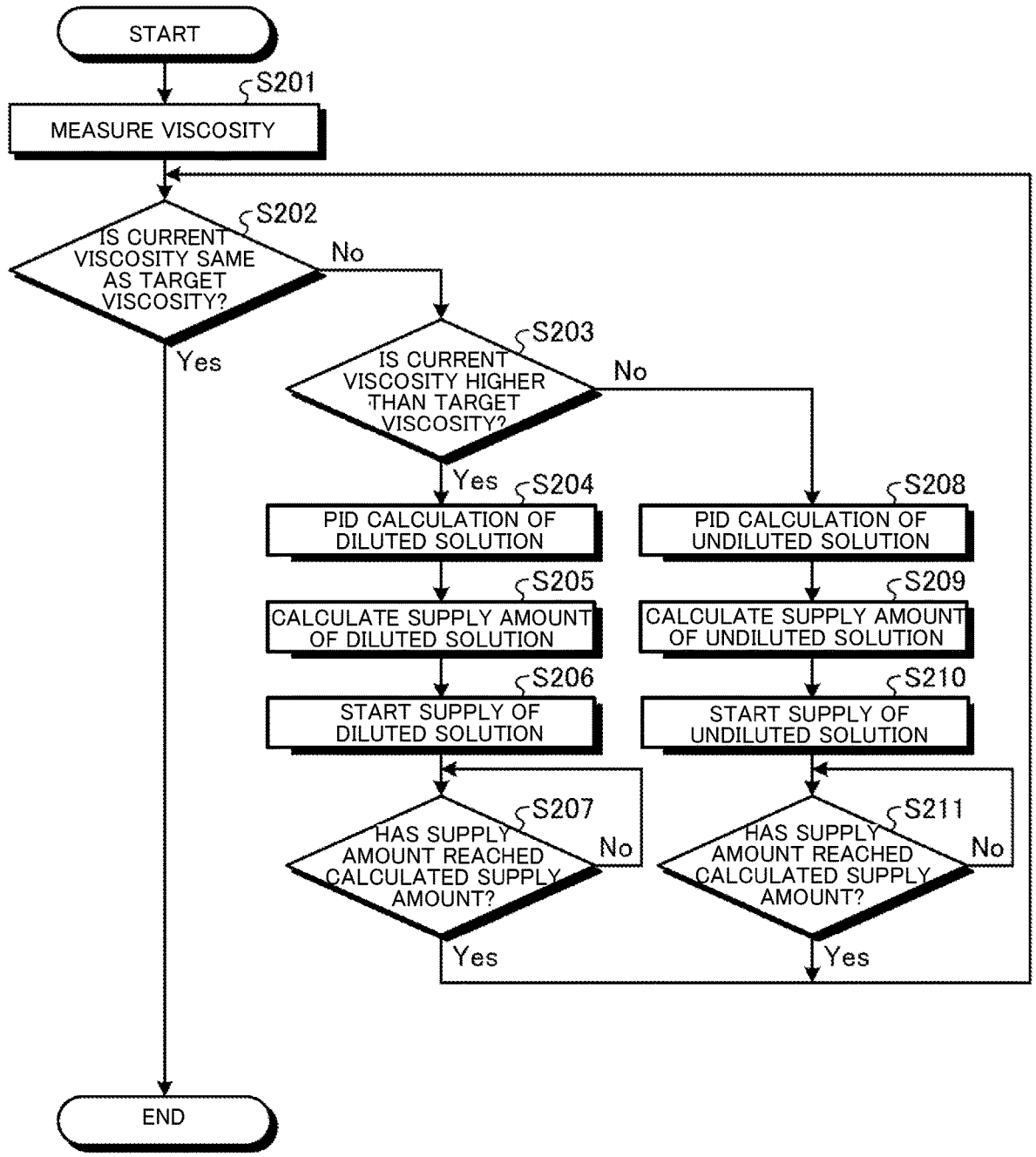
FIG. 10 is a flowchart illustrating the processing procedure executed by the preparation apparatus according to the embodiment.

As illustrated in FIG. 10, the preparation apparatus 1, first, measures the viscosity of the preparation liquid after the rough preparation using the viscosity sensor VS1 (a step S201). Subsequently, the preparation apparatus 1 determines whether or not the measured current viscosity is the same as the target viscosity (a step S202).

When the current viscosity is the same as the target viscosity (Yes in the step S202), the preparation apparatus 1 ends the process of the precise preparation. On the other hand, when the current viscosity is different from the target viscosity (No in the step S202), the preparation apparatus 1 determines whether or not the current viscosity is higher than the target viscosity (a step S203).

When the current viscosity is higher than the target viscosity (Yes in the step S203), the preparation apparatus 1 performs the PID calculation for supplying the diluted solution (a step S204) and calculates the supply amount of the diluted solution (a step S205).

Subsequently, the preparation apparatus 1 starts the supply of the diluted solution (a step S206), and determines whether the supply amount of the diluted solution has reached the calculated supply amount (a step S207). When the supply amount of the diluted solution has reached the calculated supply amount (Yes in the step S207), the preparation apparatus 1 returns to the step S202. When the supply amount of the diluted solution has not reached the calculated supply amount (No in the step S207), the preparation apparatus 1 repeats the step S207 until the supply amount of the diluted solution reaches the calculated supply amount.

On the other hand, in the step S203, when the current viscosity is lower than the target viscosity (No in the step S203), the preparation apparatus 1 performs the PID calculation for supplying the undiluted solution (a step S208) and calculates the supply amount of the undiluted solution (a step S209).

Subsequently, the preparation apparatus 1 starts the supply of the undiluted solution (a step S210), and determines whether or not the supply amount of the undiluted solution has reached the calculated supply amount (a step S211). When the supply amount of the undiluted solution has reached the calculated supply amount (Yes in the step S211), the preparation apparatus 1 returns to the step S202. When the supply amount of the undiluted solution has not reached the calculated supply amount (No in the step S211), the preparation apparatus 1 repeats the step S211 until the supply amount of the undiluted solution reaches the calculated supply amount.

Figure 11:
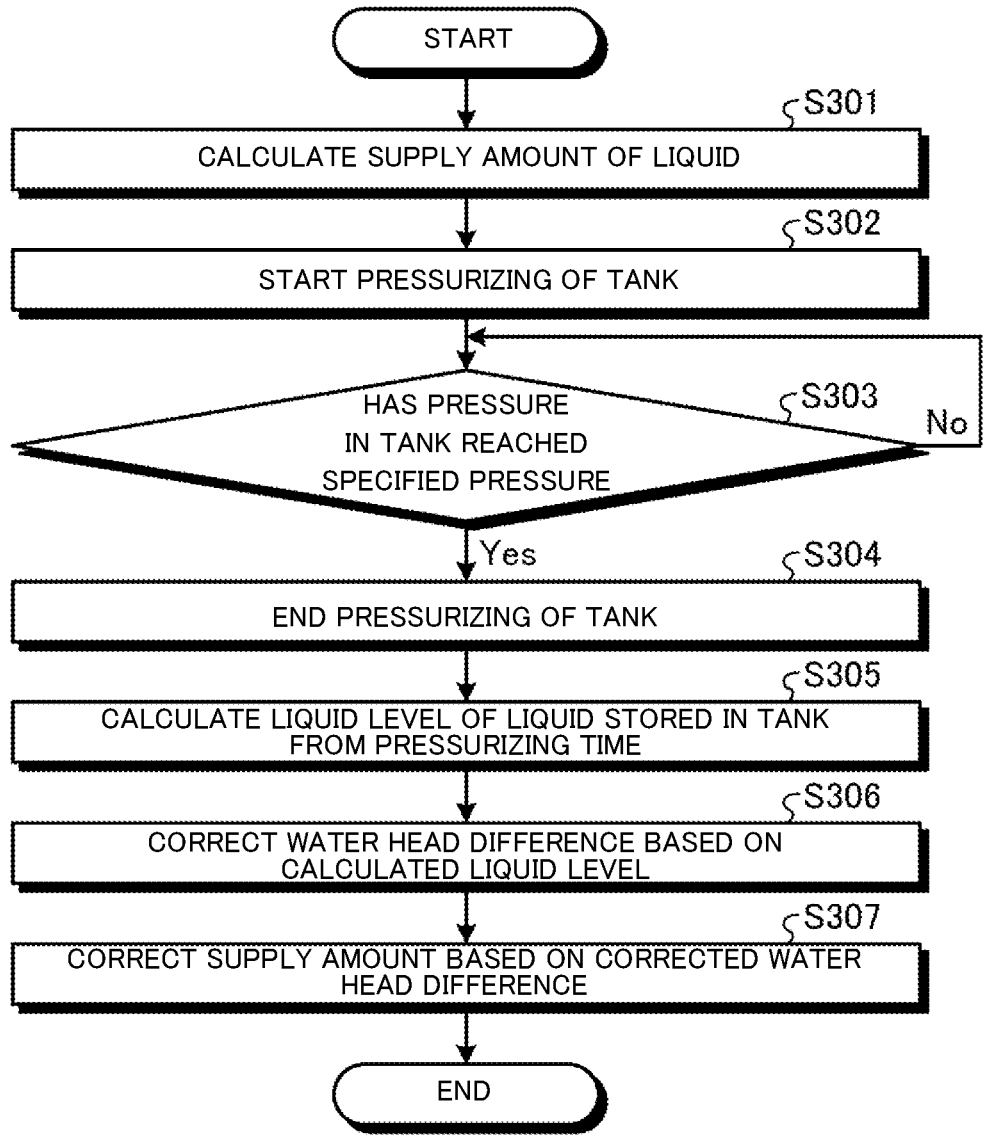
FIG. 11 is a flowchart illustrating the processing procedure executed by the preparation apparatus according to the embodiment.

Next, a processing procedure for correcting the supply amount of each of the undiluted solution and the diluted solution based on the liquid level in each of the undiluted solution tank 100 and the diluted solution tank 200 will be described with reference to FIG. 11. In FIG. 11, the undiluted solution tank 100 or the diluted solution tank 200 is collectively referred to as a tank, and the undiluted solution and the diluted solution are referred to as liquid.

As illustrated in FIG. 11, the preparation apparatus 1, first, calculates the supply amount of the liquid (a step S301). For example, the step S301 corresponds to the step S107 illustrated in FIG.9, the step S205 and the step S209 illustrated in FIG. 10.

Subsequently, the preparation apparatus 1 starts pressurizing of the tank (a step S302) and determines whether or not the pressure in the tank has reached the specified pressure (a step S303).

When the pressure in the tank has reached the specified pressure (Yes in the step S303), the preparation apparatus 1 ends the pressurizing of the tank (a step S304). When the pressure in the tank has not reached the specified pressure (No in the step S303), the preparation apparatus 1 repeatedly executes the step S303.

Subsequently, the preparation apparatus 1 calculates the liquid level of the liquid stored in the tank from the pressurizing time (a step S305) and corrects the water head difference based on the calculated liquid level (a step S306). Subsequently, the preparation apparatus 1 corrects the supply amount based on the corrected water head difference (a step S307) and ends the process.

Next, a processing procedure in the washing process will be described with referent to FIG. 12.

Figure 12:
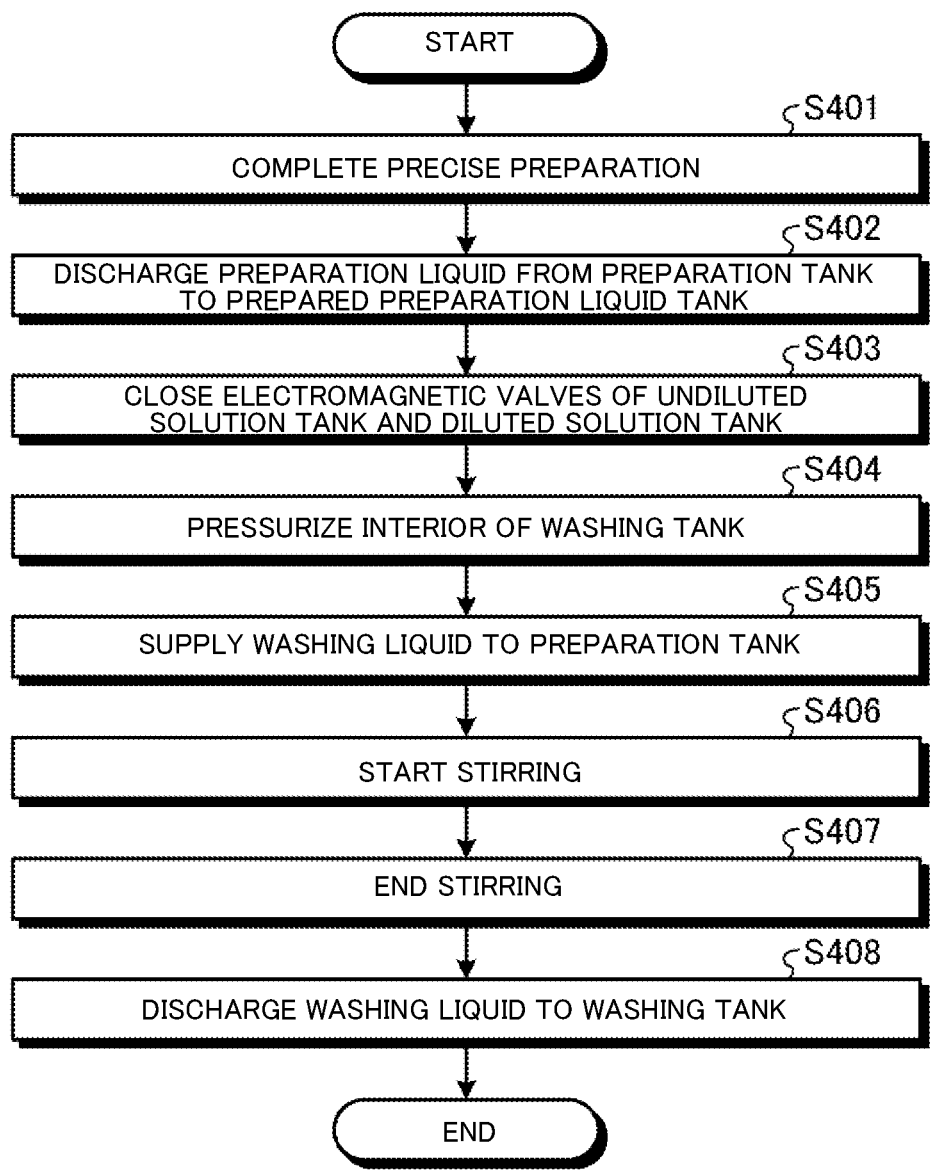
FIG. 12 is a flowchart illustrating the processing procedure executed by the preparation apparatus according to the embodiment.

As illustrated in FIG. 12, the preparation apparatus 1, first, completes the precise preparation (a step S401). Subsequently, the preparation apparatus 1 discharges the preparation liquid from the preparation tank 300 to the prepared preparation liquid tank 400 (a step S402).

Subsequently, the preparation apparatus 1 closes the electromagnetic valves (the first electromagnetic valve V1 and the second electromagnetic valve V2) of the undiluted solution tank 100 and the diluted solution tank 200 (a step S403). Subsequently, the preparation apparatus 1 pressurizes the interior of the washing tank 500 (a step S404).

Subsequently, after the preparation apparatus 1 pressurizes the interior of the washing tank 500 to a specified pressure, the preparation apparatus 1 supplies the diluted solution as the washing liquid to the preparation tank 300 (a step S405). Subsequently, the preparation apparatus 1 starts stirring in the preparation tank 300 (a step S406).

Subsequently, the preparation apparatus 1 ends the stirring (a step S407) and ends the process after discharging the washing liquid to the washing tank 500 (a step S408).

As described above, the preparation apparatus 1 according to the embodiment includes the undiluted solution tank 100 (first tank), the diluted solution tank 200 (second tank), the preparation tank 300, and the control apparatus 10. The undiluted solution tank 100 contains the undiluted solution (first liquid). The diluted solution tank 200 contains the diluted solution (second liquid) that has the lower viscosity than the undiluted solution. The preparation tank 300 stirs the undiluted solution supplied from the undiluted solution tank 100 and the diluted solution supplied from the diluted solution tank 200 to prepare the preparation liquid. The control apparatus 10 measures the viscosity of the undiluted solution based on the supply time required to supply the specified amount of the undiluted solution at the constant pressure from the undiluted solution tank 100 to the preparation tank 300, and supplies the diluted solution to the preparation tank 300 based on the measured viscosity so as to cause the preparation liquid to have the target viscosity. As a result, since the viscosity sensor that is used in the rough preparation is unnecessary, it is possible to suppress the manufacturing cost of the apparatus.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A preparation apparatus comprising:
a first tank that contains a first liquid;
a second tank that contains a second liquid having a lower viscosity than the first liquid;
a preparation tank that stirs the first liquid supplied from the first tank and the second liquid supplied from the second tank to prepare a preparation liquid;
a viscosity sensor located in the preparation tank and that measures a viscosity of the preparation liquid;
at least one liquid level sensor located in the preparation tank and that measures a height of the preparation liquid that is located in the preparation tank; and
a computer having a hardware processor configured to (i) cause a specified amount of the first liquid to be supplied at a constant pressure from the first tank to the preparation tank, the supply of the specified amount being determined to have been completed when the at least one liquid level sensor detects a first level of the first liquid in the preparation tank, (ii) determine a duration of a supply time required for the specified amount of the first liquid to be supplied at the constant pressure from the first tank to the preparation tank; (iii) determine a viscosity of the first liquid that has been supplied to the preparation tank based on a viscosity map information indicating a relationship between (1) the viscosity of the first liquid and (2) the duration of the supply time that was determined for supplying the specified amount of the first liquid at the constant pressure from the first tank to the preparation tank, (iv) after the specified amount of the first liquid has been supplied to the preparation tank, supply an amount of the second liquid to the preparation tank based on the viscosity of the first liquid that has been determined based on the duration of the supply time of the specified amount of the first liquid so as to cause the preparation liquid to have a target viscosity, (v) measure the viscosity of the preparation liquid using the viscosity sensor after the amount of the second liquid has been supplied to the preparation tank, (vi) when the viscosity of the preparation liquid that was measured using the viscosity sensor after the amount of the second liquid has been supplied to the preparation tank is greater than a target viscosity, add a second amount of the second liquid to the preparation tank, (vii) when the viscosity of the preparation liquid that was measured using the viscosity sensor after the amount of the second liquid has been supplied to the preparation tank is less than the target viscosity, add an amount of the first liquid to the preparation tank, and (viii) repeat (vi) and/or (vii) until the viscosity of the preparation liquid measured by the viscosity sensor is the target amount.

2. The preparation apparatus according to claim 1, wherein
the hardware processor is configured to, after the specified amount of the first liquid has been supplied to the preparation tank and the viscosity of the first liquid has been determined, (a) first supply a first amount of the second liquid to the preparation tank based on the viscosity of the first liquid that has been determined so as to set the viscosity of the preparation liquid higher than the target viscosity, and (b) second supply the second amount of the second liquid to the preparation tank based on the viscosity of the preparation liquid measured by the viscosity sensor after the first amount of the second liquid has been supplied to the preparation tank, so as to cause the preparation liquid to have the target viscosity.

3. The preparation apparatus according to claim 1, wherein
the hardware processor is configured to control a supply amount of the second liquid by controlling a supply time of the second liquid in a state in which a pressure of the second liquid supplied from the second tank to the preparation tank is kept constant.

4. The preparation apparatus according to claim 1, further comprising:
a temperature sensor that measures a temperature of the first liquid supplied to the preparation tank, wherein
the hardware processor is configured to correct the measured viscosity of the first liquid according to the temperature of the first liquid that has been measured.

5. The preparation apparatus according to claim 2, further comprising:
a first electromagnetic valve provided in a first supply route between the first tank and the preparation tank, and a second electromagnetic valve provided in a second supply route between the second tank and the preparation tank, wherein
the hardware processor is configured to, after the specified amount of the first liquid has been supplied to the preparation tank and the viscosity of the first liquid has been determined, control a supply amount of each of the first liquid and the second liquid to the preparation tank by controlling open and close times of the first and second electromagnetic valves based on a deviation between a current viscosity of the preparation liquid and the target viscosity.

6. The preparation apparatus according to claim 1, further comprising:
a first pump that pressurizes an interior of the first tank; and
a second pump that pressurizes an interior of the second tank, wherein
the hardware processor is configured to detect a liquid level of each of the first liquid in the first tank and the second liquid in the second tank based on a pressurizing time by each of the first pump and the second pump until the interior of each of the first tank and the second tank is pressurized to a specified pressure.

7. The preparation apparatus according to claim 1, further comprising:
a washing tank that is connected to a discharge port from which the preparation liquid of the preparation tank is discharged, the washing tank containing the second liquid, wherein
the hardware processor is configured to, in a washing process after discharging the preparation liquid from the preparation tank, supply the second liquid from the washing tank to the preparation tank via the discharge port, and after completing the washing process, discharge the second liquid from the preparation tank to the washing tank via the discharge port.

8. The preparation apparatus according to claim 1, further comprising:
a discharge route that is connected to a discharge port of the preparation tank and through which the preparation liquid discharged from the discharge port is discharged to an outside of the preparation tank; and
a bubble supply apparatus that is connected to a branched route branched from the discharge route and that supplies air bubbles from the branched route to the discharge port, wherein
the hardware processor is configured to stir the preparation liquid filled between the branched route and the discharge port by causing the bubble supply apparatus to supply the air bubbles.

9. A preparation method executed by a preparation apparatus that includes:
a first tank that contains a first liquid;
a second tank that contains a second liquid having a lower viscosity than the first liquid;
a preparation tank that stirs the first liquid supplied from the first tank and the second liquid supplied from the second tank to prepare a preparation liquid;
a viscosity sensor located in the preparation tank and that measures a viscosity of the preparation liquid; and
at least one liquid level sensor located in the preparation tank and that measures a height of the preparation liquid that is located in the preparation tank, the method comprising the steps of:
(a) causing a specified amount of the first liquid to be supplied at a constant pressure from the first tank to the preparation tank, the supply of the specified amount being determined to have been completed when the at least one liquid level sensor detects a first level of the first liquid in the preparation tank;
(b) determining a duration of a supply time required for the specified amount of the first liquid to be supplied at the constant pressure from the first tank to the preparation tank;
(c) determining a viscosity of the first liquid that has been supplied to the preparation tank based on a viscosity map information indicating a relationship between (1) the viscosity of the first liquid and (2) the duration of the supply time that was determined for supplying the specified amount of the first liquid at the constant pressure from the first tank to the preparation tank;

(d) after the specified amount of the first liquid has been supplied to the preparation tank, supplying an amount of the second liquid to the preparation tank based on the viscosity of the first liquid that has been determined based on the duration of the supply time of the specified amount of the first liquid so as to cause the preparation liquid to have a target viscosity;

(e) measuring the viscosity of the preparation liquid using the viscosity sensor after the amount of the second liquid has been supplied to the preparation tank;

(f) when the viscosity of the preparation liquid that was measured using the viscosity sensor after the amount of the second liquid has been supplied to the preparation tank is greater than a target viscosity, adding a second amount of the second liquid to the preparation tank;

(g) when the viscosity of the preparation liquid that was measured using the viscosity sensor after the amount of the second liquid has been supplied to the preparation tank is less than the target viscosity, adding an amount of the first liquid to the preparation tank; and (h) repeating (f) and/or (g) until the viscosity of the preparation liquid measured by the viscosity sensor is the target amount.

10. A control apparatus that controls preparation of a preparation liquid by stirring a first liquid and a second liquid having a lower viscosity than the first liquid in a preparation tank, a viscosity sensor being located in the preparation tank, the viscosity sensor being configured to measure a viscosity of the preparation liquid in the preparation tank, at least one liquid level sensor being located in the preparation tank and being configured to measure a height of the preparation liquid that is located in the preparation tank, the control apparatus including a computer having a hardware processor configured to:

(i) cause a specified amount of the first liquid to be supplied at a constant pressure from a first tank to the preparation tank, the supply of the specified amount being determined to have been completed when the at least one liquid level sensor detects a first level of the first liquid in the preparation tank;

(ii) determine a duration of a supply time required for the specified amount of the first liquid to be supplied at the constant pressure from the first tank to the preparation tank:

(iii) determine a viscosity of the first liquid that has been supplied to the preparation tank based on a viscosity map information indicating a relationship between (1) the viscosity of the first liquid and (2) the duration of the supply time that was determined for supplying the specified amount of the first liquid at the constant pressure from the first tank to the preparation tank;

(iv) after the specified amount of the first liquid has been supplied to the preparation tank, cause an amount of the second liquid to be supplied to the preparation tank based on the viscosity of the first liquid that has been determined based on the duration of the supply time of the specified amount of the first liquid so as to cause the preparation liquid to have a target viscosity;

(v) measure the viscosity of the preparation liquid using the viscosity sensor after the amount of the second liquid has been supplied to the preparation tank;

(vi) when the viscosity of the preparation liquid that was measured using the viscosity sensor after the amount of the second liquid has been supplied to the preparation tank is greater than a target viscosity, add a second amount of the second liquid to the preparation tank;

(vii) when the viscosity of the preparation liquid that was measured using the viscosity sensor after the amount of the second liquid has been supplied to the preparation tank is less than the target viscosity, add an amount of the first liquid to the preparation tank; and (viii) repeat (vi) and/or (vii) until the viscosity of the preparation liquid measured by the viscosity sensor is the target amount.

\* \* \* \* \*